United States Patent

Hartlaub

(10) Patent No.: US 7,992,932 B2
(45) Date of Patent: Aug. 9, 2011

(54) ACTUATING ELEMENT FOR A CRASH-ACTIVE HEAD REST

(75) Inventor: Silvio Hartlaub, Köln (DE)

(73) Assignee: Johnson Controls GmbH, Burscheid (DE)

(*) Notice: Subject to any disclaimer, the term of this patent is extended or adjusted under 35 U.S.C. 154(b) by 0 days.

(21) Appl. No.: 11/664,677

(22) PCT Filed: Oct. 6, 2005

(86) PCT No.: PCT/EP2005/055053
§ 371 (c)(1),
(2), (4) Date: Apr. 5, 2007

(87) PCT Pub. No.: WO2006/037801
PCT Pub. Date: Apr. 13, 2006

(65) Prior Publication Data
US 2007/0262631 A1    Nov. 15, 2007

(30) Foreign Application Priority Data
Oct. 6, 2004  (DE) .......................... 10 2004 048 910

(51) Int. Cl.
*B60N 2/42*    (2006.01)
*B60N 2/427*   (2006.01)
*B60R 21/055*  (2006.01)

(52) U.S. Cl. .................................. 297/216.12
(58) Field of Classification Search ............... 297/216.1, 297/216.12
See application file for complete search history.

(56) References Cited

U.S. PATENT DOCUMENTS

| | | | | |
|---|---|---|---|---|
| 3,628,197 | A * | 12/1971 | Leventhal et al. | 4/451 |
| 5,168,629 | A * | 12/1992 | Willard | 30/231 |
| 5,823,619 | A * | 10/1998 | Heilig et al. | 297/216.12 |
| 5,882,071 | A * | 3/1999 | Fohl | 297/216.12 |
| 6,082,817 | A * | 7/2000 | Muller | 297/216.12 |
| 6,273,511 | B1 | 8/2001 | Wieclawski | |
| 6,474,733 | B1 * | 11/2002 | Heilig et al. | 297/216.12 |
| 6,572,186 | B1 * | 6/2003 | Fischer et al. | 297/216.12 |
| 6,719,368 | B1 * | 4/2004 | Neale | 297/216.14 |
| 6,749,256 | B1 | 6/2004 | Klier et al. | |
| 6,767,064 | B2 * | 7/2004 | Veine et al. | 297/391 |
| 6,824,212 | B2 * | 11/2004 | Malsch et al. | 297/216.12 |
| 7,044,545 | B2 * | 5/2006 | Ohchi et al. | 297/216.12 |
| 7,234,769 | B2 * | 6/2007 | Takenaka et al. | 297/216.12 |
| 2001/0040396 | A1* | 11/2001 | Kreuels et al. | 297/216.12 |
| 2004/0155496 | A1 | 8/2004 | Farquhar et al. | |
| 2005/0280296 | A1* | 12/2005 | Ohchi et al. | 297/216.12 |
| 2008/0272631 | A1* | 11/2008 | Hartlaub | 297/216.12 |
| 2009/0102254 | A1* | 4/2009 | Veine et al. | 297/216.12 |
| 2009/0315370 | A1* | 12/2009 | Hartlaub | 297/216.12 |
| 2009/0322127 | A1* | 12/2009 | Michalak et al. | 297/216.12 |

FOREIGN PATENT DOCUMENTS

| | | |
|---|---|---|
| DE | 84 12 967 U1 | 8/1984 |
| DE | 296 14 978 U1 | 2/1997 |
| DE | 197 38 201 A1 | 4/1998 |
| DE | 100 41 528 A1 | 3/2002 |
| DE | 102 32 017 C1 | 9/2003 |
| DE | 202 17 258 U1 | 4/2004 |

* cited by examiner

*Primary Examiner* — Rodney B White
(74) *Attorney, Agent, or Firm* — Foley & Lardner LLP

(57) ABSTRACT

The present invention relates to an actuating means with which the position of a component can be changed directly or indirectly.

11 Claims, 3 Drawing Sheets

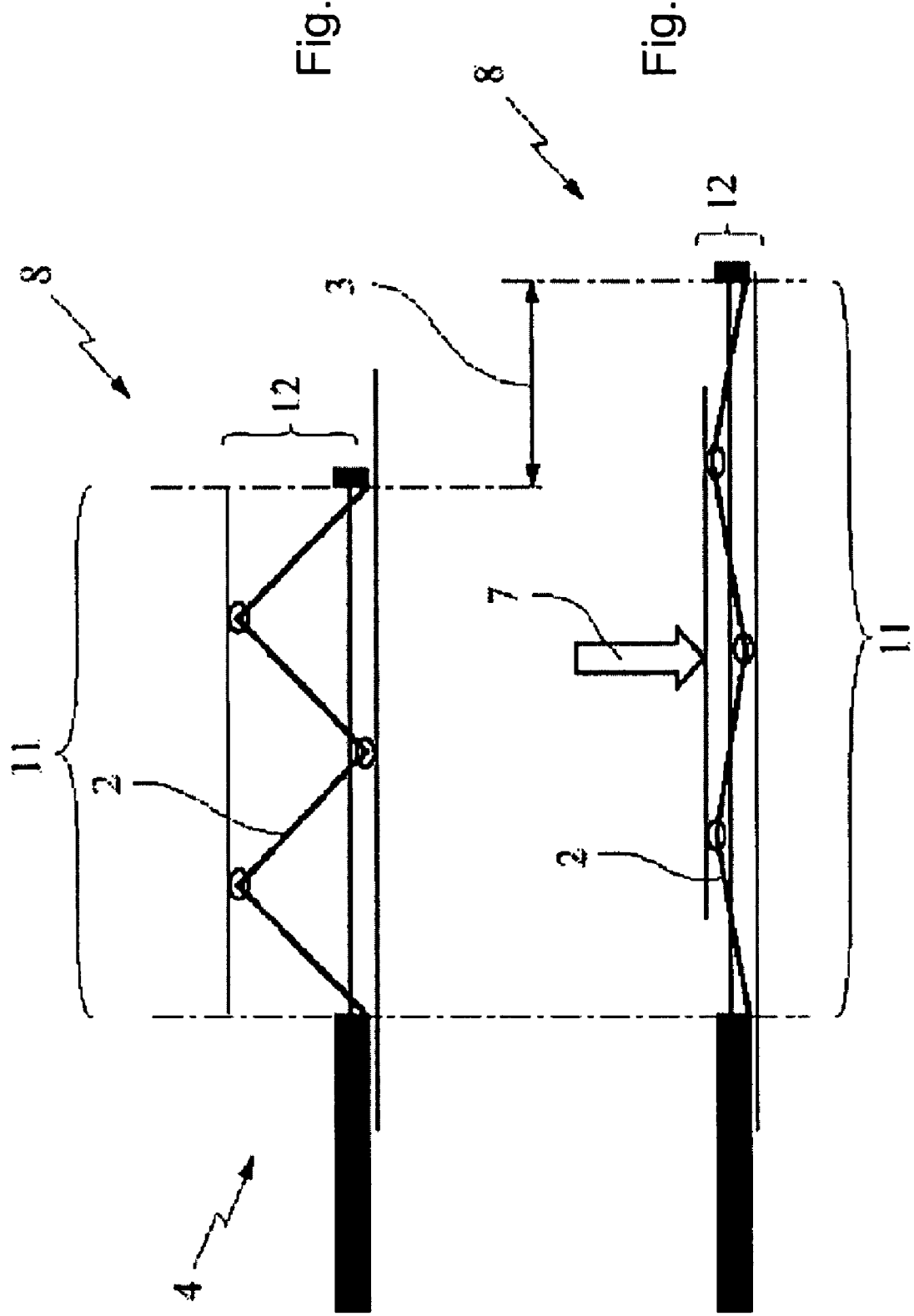

ACTUATING ELEMENT FOR A CRASH-ACTIVE HEAD REST

CROSS-REFERENCE TO RELATED PATENT APPLICATIONS

This application is a National Stage Application of, and claims the benefit of priority to, International Application No. PCT/EP2005/055053 titled "Actuating Means for a Crash-Active Head Restraint" filed Oct. 6, 2005, which claims priority to German Patent Application No. DE 10 2004 048 910.6 filed Oct. 6, 2004, both of which are incorporated herein by reference in their entireties.

TECHNICAL FIELD

The present disclosure relates to an actuating means with which the position of a component can be changed directly or indirectly.

BACKGROUND

Structures, for example, Bowden cables, are known for actuating head restraints in the event of a rear impact. A system of this type is described, for example, in DE 100 41 528 A1, but this has a disadvantage in that the actuating means is loaded in tension. Actuating means of this type, in particular immediately after the crash, have a comparatively small point of actuation, although an actuation that is as large as possible is desired in particular at this point.

It is therefore desirable to provide an actuating means that does not have the disadvantages mentioned above.

SUMMARY

One exemplary embodiment relates to an actuating means to change the position of a component. The actuating means has transmitting means that directly or indirectly transmits a force applied to the transmitting means to the component and, in the process, directly or indirectly changes the position of the component, and the transmitting means is configured to be loaded in compression.

Another exemplary embodiment relates to a seat for a motor vehicle that includes a head restraint, and an actuating means arranged to directly or indirectly transmit a force applied to the actuating means to the head restraint to change at least partially a position of the head restraint, wherein the actuating means is configured to be loaded in compression.

Another exemplary embodiment relates to an actuator for a head restraint of a motor vehicle seat. The actuator includes a plurality of limbs. The limbs directly or indirectly transmit a force applied to the limbs to the head restraint and, in the process, directly or indirectly change the position of the head restraint. The limbs are configured to move with respect to the seat and are extendible upon application of the force.

Another exemplary embodiment relates to a vehicle seat that includes a back rest, a head restraint, and an actuator movable with respect to the back rest. The actuator interfaces, directly or indirectly, with the head restraint to change at least partially a position of the head restrain upon application of a force to the actuator. The actuator is configured to be loaded in compression.

BRIEF DESCRIPTION OF DRAWINGS

The invention is explained below with reference to FIGS. 1a-1b, 2a-2b, and 3. These explanations are merely by way of example and do not restrict the general concept of the invention.

FIGS. 1a and 1b are schematic side views of an actuating means according to an exemplary embodiment;

DETAILED DESCRIPTION

Figure 2A:
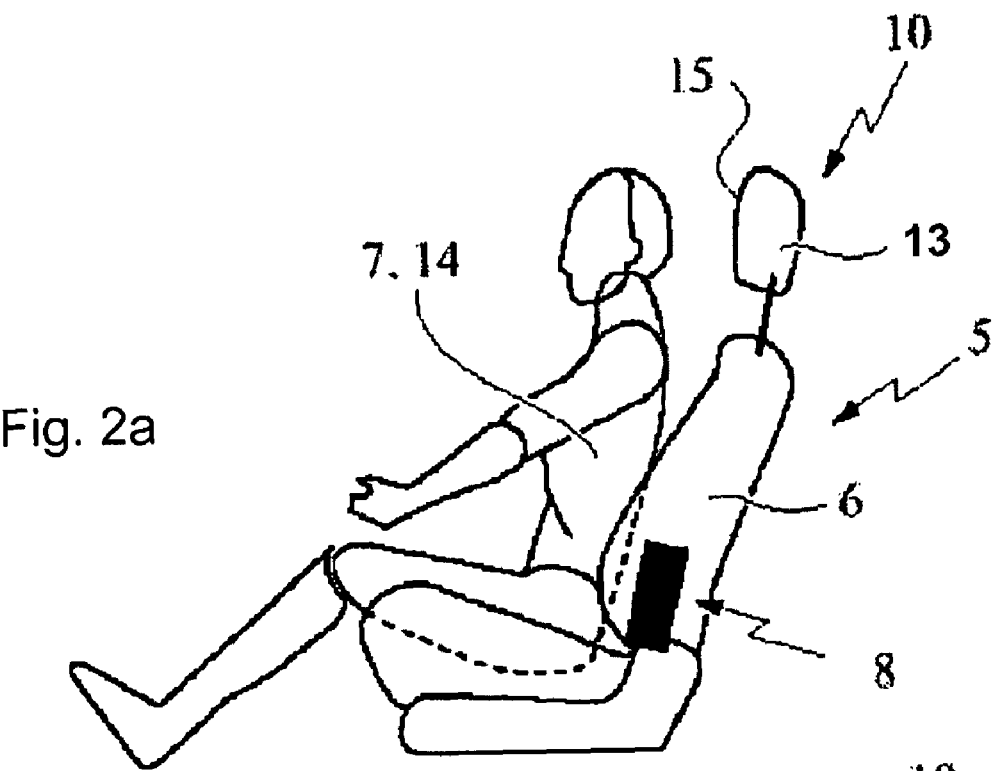
FIGS. 2a and 2b are schematic side views of a seat according to an exemplary embodiment.

FIGS. 1a and 1b illustrate an actuating means 8. The original shape of the actuating means, for example before a crash, is illustrated in FIG. 1a, and the actuated shape of the actuating means, for example during or after a crash, is illustrated in FIG. 1b. In the present embodiment, the actuating means 8 comprises four elements 2 that are arranged at an angle with respect to one another. Under the application of force, which is symbolized by the arrow 7, the limbs 2 of the actuating means 8 are spread, so that the cross section 12 thereof is reduced and it undergoes an extension with respect to its transverse axis 11, which extension is symbolized by the double arrow 3. This extension is transmitted to a Bowden cable that in turn changes a component, for example a head restraint, in its position, this action being described in more detail with reference to FIGS. 2a-b and 3. The actuating element may also be part of a Bowden cable. Furthermore, the actuation may be reversible. In this case, the actuating element would move back into its original shape as soon as the force 3 is no longer being applied.

Figure 2B:
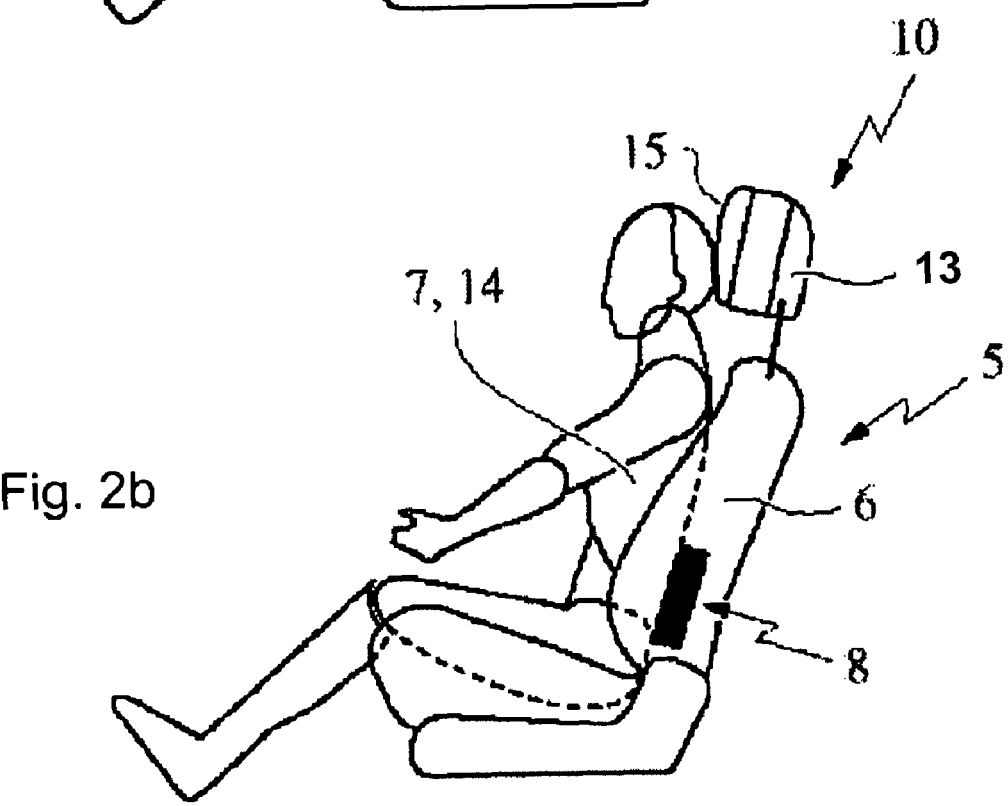

FIGS. 2a-b show an embodiment of the car seat 5 in which there is an occupant in the form of a dummy 14. FIG. 2a shows the situation before an accident and FIG. 2b shows the situation after or during an accident, in which a vehicle impacts from the rear against the car in which the seat which is illustrated is situated. The seat has a back rest 6 in which the actuating means 8 is situated. A head restraint 13 is arranged in the upper part of the seat, the head restraint having a front part 15 that faces the occupant and can be moved in its position in the direction of the vehicle occupant's head. It can be seen that, during normal operation of the motor vehicle (as shown in FIG. 2a), the actuating means has a comparatively thick cross section and the front part 15 of the head restraint is at a comparatively large distance from the occupant's head. In the event of a rear impact (as shown in FIG. 2b), the occupant is pressed into the vehicle seat, in particular into the back rest, and, as a result, compresses the actuating element 8, which, in turn, as already explained with reference to FIGS. 1a-b, leads to an extension 3 of the actuating element. This extension is transmitted by a Bowden cable (not illustrated) into the head restraint and leads there to a change in the position 10 of the front part 15 of the head restraint 13. The front part 15 of the head restraint is moved in the direction of the occupant. It is also possible to move not only the front part of the head restraint, but also the head restraint in its entirety. The change in position of the front part of the head restraint can be brought about directly by the force resulting from the actuating element—if appropriate transmitted by a Bowden cable. However, it is also conceivable for the actuating element merely to trigger the movement of the front part by, for example, an energy store in the form of a spring or the igniter of an airbag being actuated.

Figure 3:
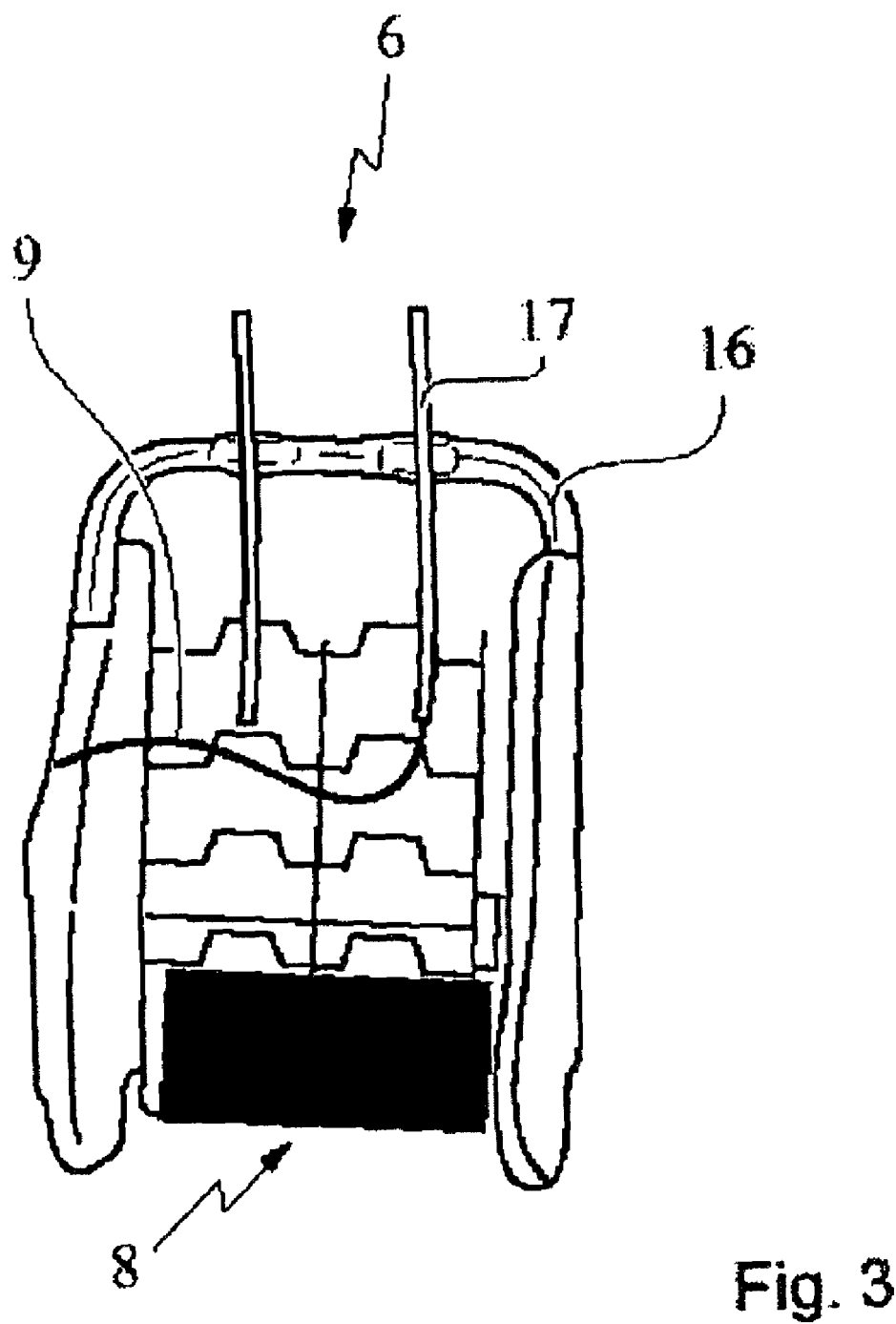
FIG. 3 is a perspective view of the seat according to the embodiment of FIGS. 2a and 2b.

FIG. 3 illustrates aback rest 6. The actuating element 8 is arranged between the limbs of the frame 16 of the back rest 6. It can furthermore be seen that the actuating element 8 is connected to a Bowden cable 9 that is guided through the mount 17 of the head restraint (not illustrated) in order, in the head restraint, to bring about a change in the position of the front part 15 of the head restraint in the event of a rear impact.

The actuating means has very good actuation, in particular immediately after an application of force, for example by means of a rear impact, with the result that, for example, a head restraint can be moved very rapidly in the direction of the occupant's head. As a result, injuries to the occupants can be avoided. The actuating system is simple and cost-effective to produce. Since the actuating system is compressed, for example in the event of a rear impact, injuries to the pelvic floor are largely avoided.

The actuating means has means that directly or indirectly transmits a force from a drive unit to a component and, in the process, directly or indirectly changes the position of the component. Furthermore, these means are loaded in compression. These means may have any configuration. For example, the means can be arranged in such a manner that the position of the means with respect to one another changes during a transmission of force in such a manner that an extension with respect to the longitudinal or transverse axis of the actuating means can be obtained. This extension can be transmitted, for example, to a Bowden cable that directly or indirectly transmits the displacement or the force resulting therefrom to a component, for example a head restraint. It is also conceivable for the actuating means itself to be part of a Bowden cable. In one embodiment, the means are limbs that are arranged at an angle to one another and are spread under the application of force.

The actuating system can be used for the transmission of force in the case of and/or for the displacement of any desired component. For example, it can be part of a seat of a motor vehicle and, in particular, it can be arranged in the back rest of a motor vehicle.

The present application therefore also relates to a seat, in particular of a motor vehicle, with an actuating means and a head restraint, it being possible for the position of the head restraint to be at least partially changed directly or indirectly with the actuating means.

Injuries to the occupant, in particular in the case of a rear impact, can be very efficiently avoided with the seat according to the present application, in particular owing to the fact that immediately after the impact the head restraint is very rapidly changed in its position in the direction of the occupant's head, so that injuries, in particular in the region of the cervical vertebrae, are avoided. The seat according to the present application is simple and cost-effective to produce.

The actuating means at least partially changes the position of the head restraint. Furthermore, the change in position can take place directly or indirectly. The change in the position of the head restraint can take place in the event of a rear impact.

The actuating means is actuated by the vehicle occupant. This actuation takes place in particular owing to the fact that the vehicle occupant is pressed into the vehicle seat in the event of a rear impact. The momentum arising in the process and the forces resulting therefrom are used to compress the cross section of the actuating means. The resultant change in length of the actuating means is used to move the head restraint or parts of the head restraint.

The actuating means preferably interacts with a Bowden cable or is part of a Bowden cable with which the force is passed from the actuating means to the head restraint in order at least partially to change the position thereof.

The invention claimed is:

1. A seat for a motor vehicle, comprising:
a back rest;
a head restraint supported above the back rest by at least one mount, the head restraint having a front part and a rear part;
an actuator arranged in the seat and arranged to transmit a force imposed by an occupant in case of a rear impact of the motor vehicle from the actuator to the head restraint so that the front part of the head restraint is actuated while the rear part of the head restraint stays in place, whereas the actuator is configured to be loaded in compression and wherein the actuator moves back into an original shape as soon as the force is no longer imposed; and
a Bowden cable arranged between the actuator and the head restraint, the Bowden cable being guided through the at least one mount,
wherein movement of the front part of the head restraint relative to the rear part of the head restraint is translational.

2. The seat of claim 1 wherein the actuator is arranged in the back rest of the seat.

3. The seat of claim 1 wherein the actuator comprises a plurality of limbs that are configured to spread in response to the force imposed by the occupant.

4. The seat of claim 3 wherein movement of the limbs is reversible so that the limbs return to the original position when the force is no longer being imposed by the occupant.

5. The seat of claim 3 wherein the plurality of limbs comprises four limbs that are arranged at an angle with respect to one another.

6. The seat of claim 5 wherein the four limbs are configured to spread relative to each other in response to the force imposed by the occupant so as to reduce a cross section of the actuator and increase a length of the actuator.

7. The seat of claim 6 wherein the length of the actuator is configured to be extended in a direction towards an upper portion of the back rest.

8. The seat of claim 3 wherein the movement of the limbs is transmitted to the head restraint by the Bowden cable.

9. The seat of claim 1 wherein the front part is configured to move towards the occupant when actuated.

10. The seat of claim 1 wherein the front part and the rear part of the head restraint are positioned entirely above the back rest.

11. The seat of claim 1 wherein the back rest comprises a seat frame having a pair of substantially vertical side members, the actuator being arranged between vertical members.

* * * * *